May 30, 1933. C. H. WHITE 1,911,218
MARKER
Filed Nov. 20, 1929 5 Sheets-Sheet 2
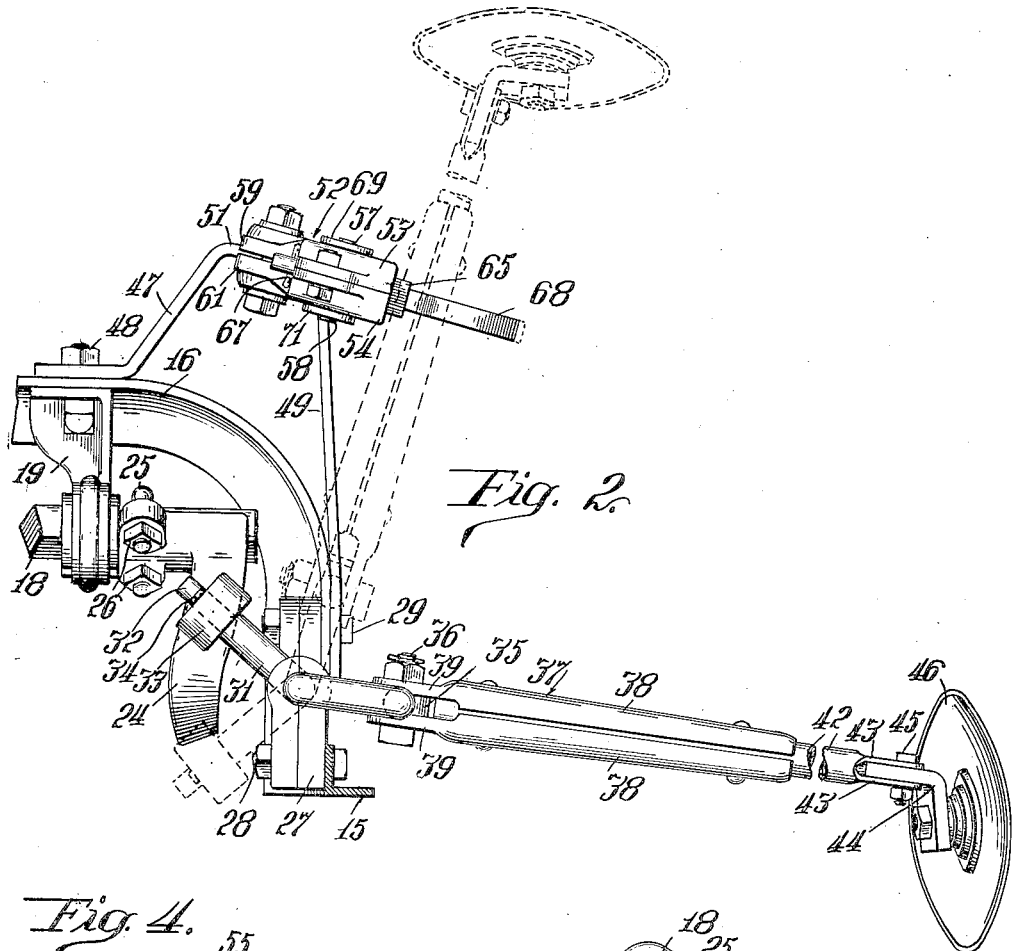
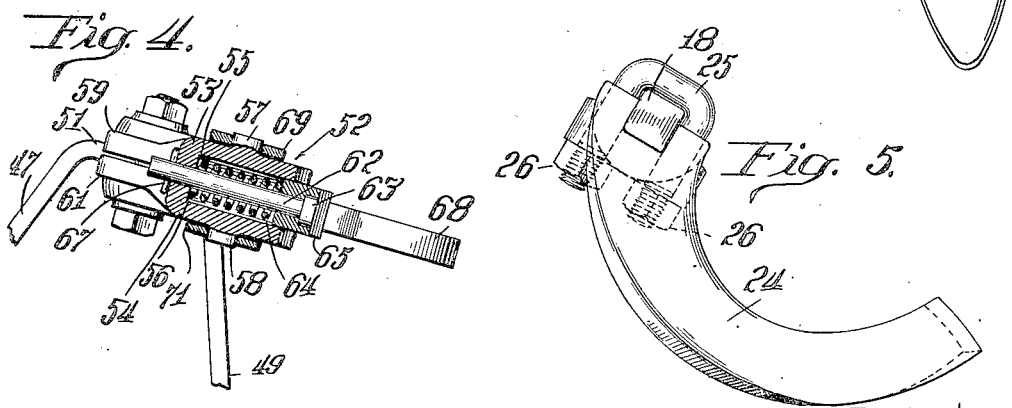
Witness
Milton Lenoir
Inventor
Charles H. White
By Brown, Jackson, Boettcher & Dienner
Attorneys

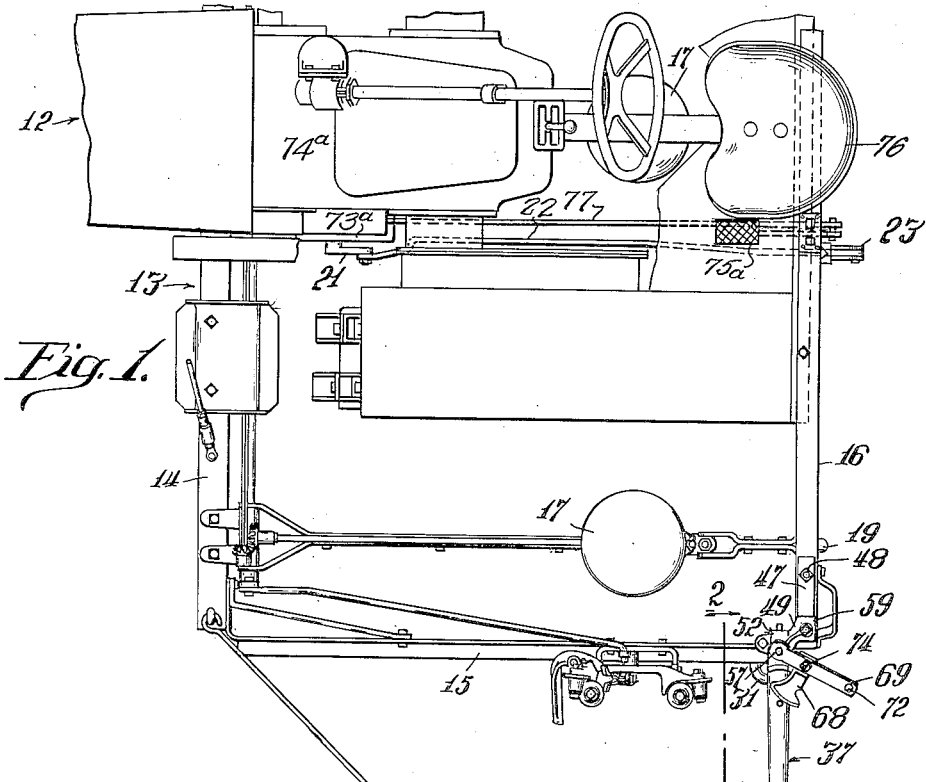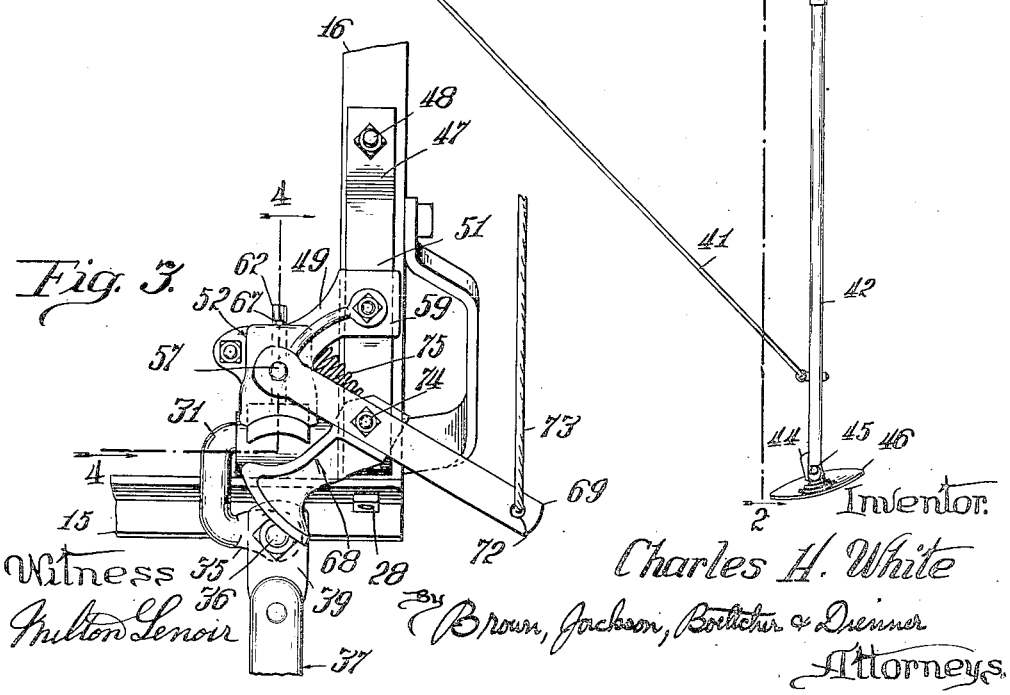

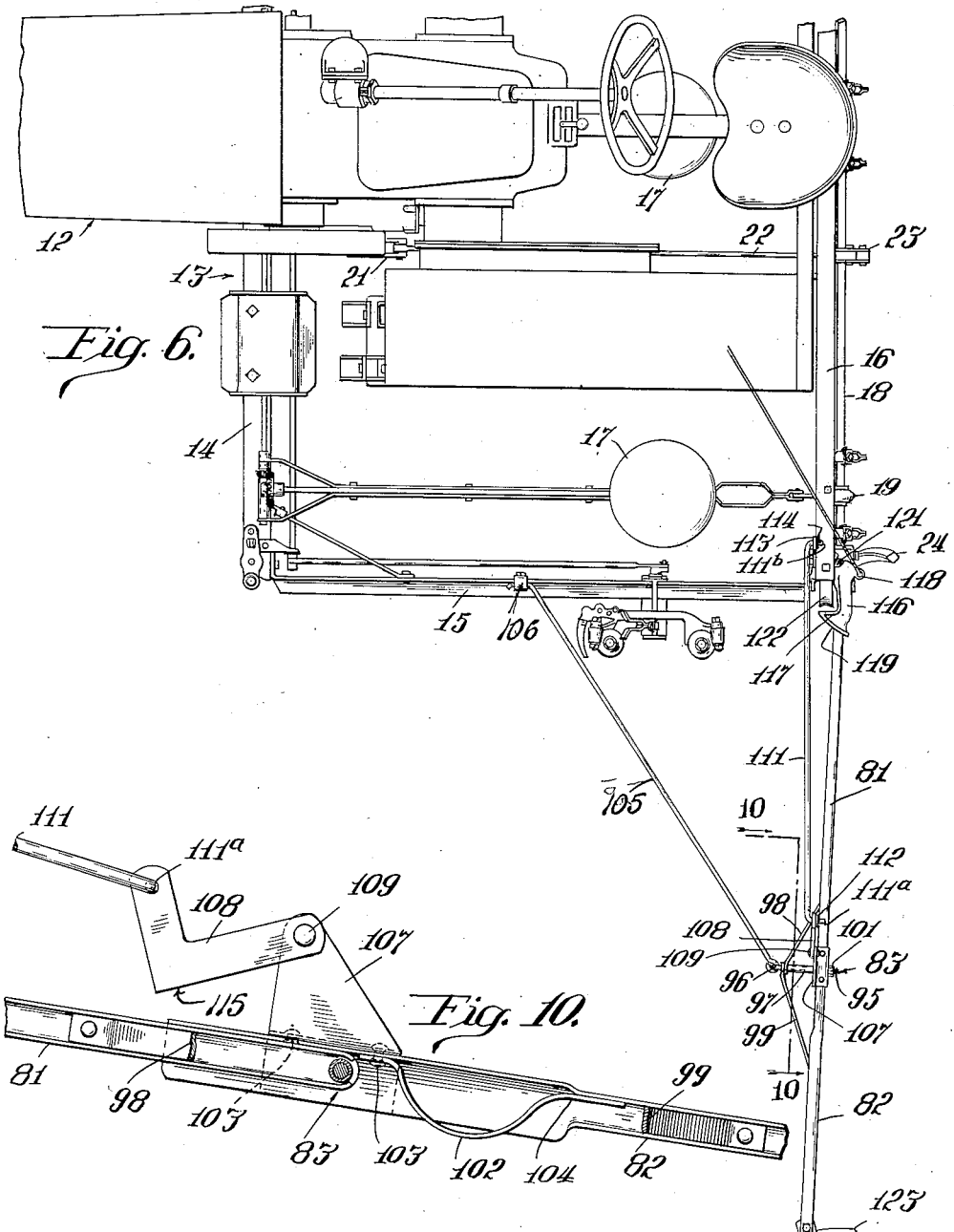

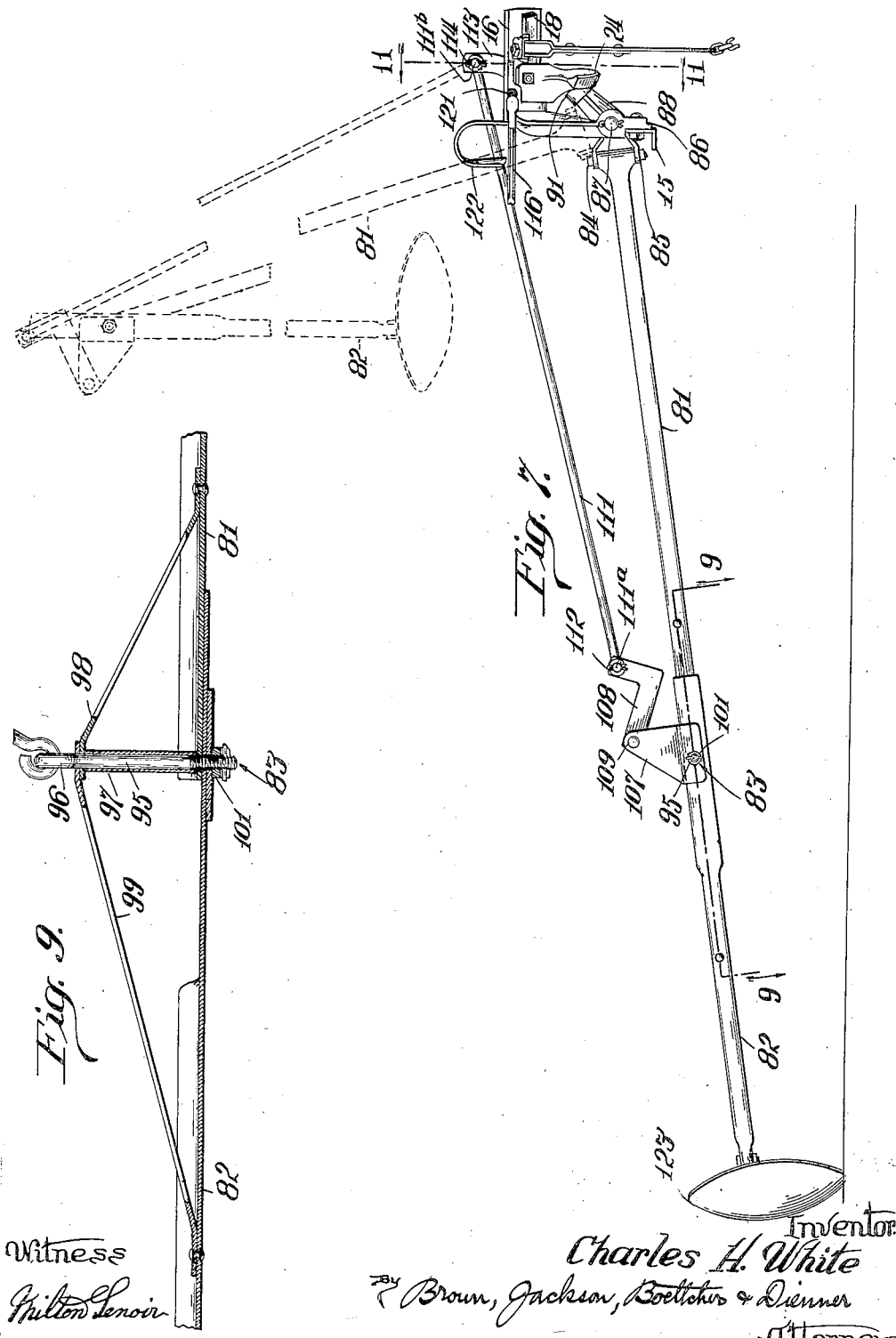

May 30, 1933.  C. H. WHITE  1,911,218
MARKER
Filed Nov. 20, 1929  5 Sheets-Sheet 5
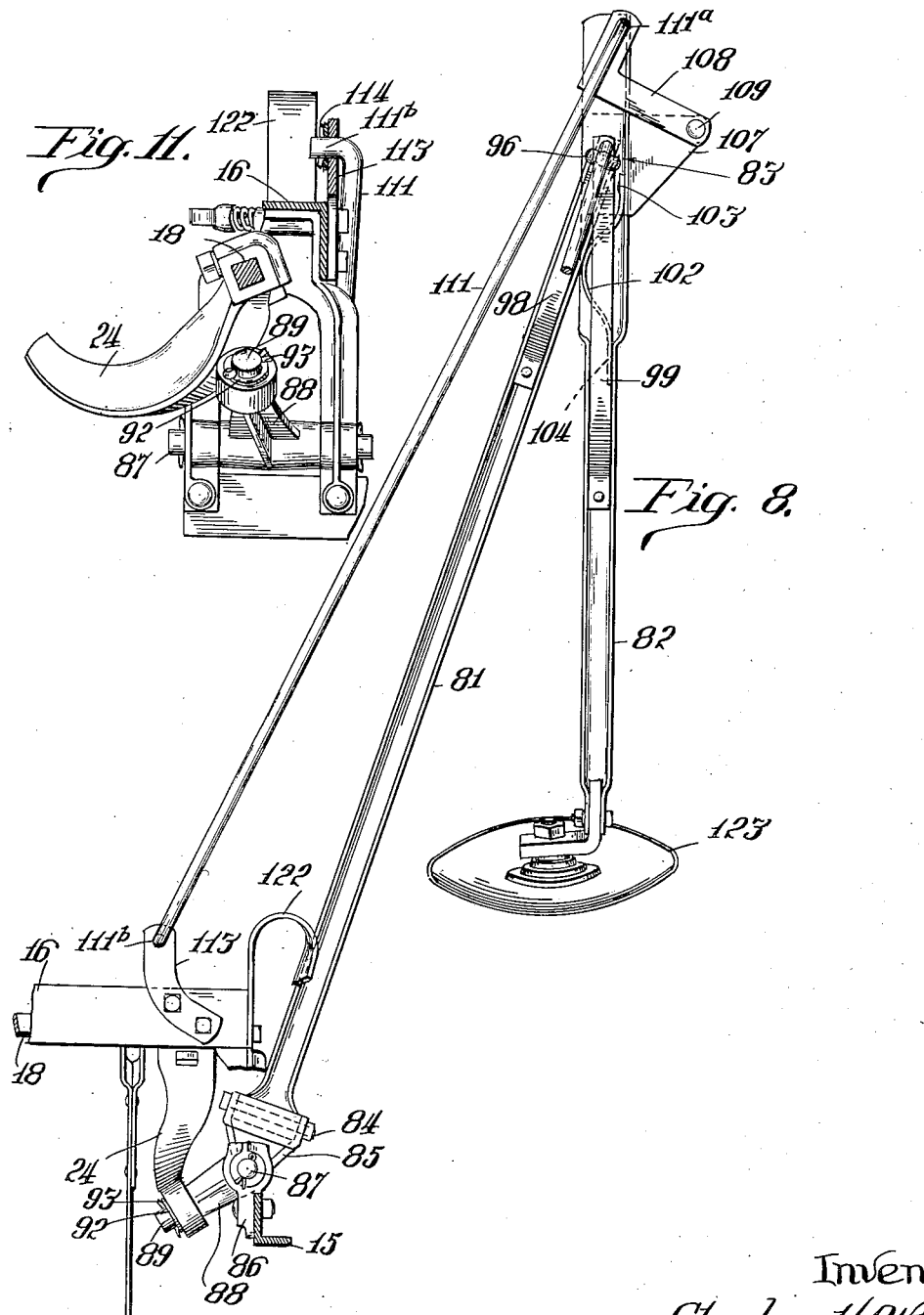
Inventor
Charles H. White
By Brown, Jackson, Boettcher & Dienner
Attorneys
Witness
Milton Lenoir Patented May 30, 1933

1,911,218

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

MARKER

Application filed November 20, 1929. Serial No. 408,445.

This invention relates to an improvement in planters, and more particularly to an improvement in power operated markers employed with the type of tractor planter shown and described in my copending application, Serial No. 220,472, for Tractor planters, filed September 19, 1927, of which this application is a division in part.

In my copending application above identified, I have disclosed a planter unit adapted to be readily mounted on a tractor. In order to realize the advantages of motor driven tractors, it is desirable that all operations attendant to the tractor and the implement carried thereby, be capable of being performed by one operator, quickly and easily. The operation of manually lifting a number of planter units and a marker arm at each end of the field is burdensome, and usually requires stopping of the tractor for the performance of lifting operations before a turn can be made.

This objection has been overcome in my copending application, above identified, by the provision of an improved form of power operated lift mechanism which derives its operating energy from a power take-off device on the tractor, and which is made operative through a simple control movement on the part of the operator, to raise all the planter units at the ends of the field. The planter has on either side thereof and at the rear corners, a marker comprising an arm pivoted to the implement frame, on the outer end of which a disk or other suitable marker element is supported. These marker arms are also power operated to both operative and inoperative positions. By virtue of such an arrangement, the operator can devote most of his attention to steering the tractor as the end of the field is approached, and there is no necessity for stopping the tractor when the turn is about to be made. After the implement has been turned around, all operative planting units and the marker arm desired to be used, may be dropped to operative position by the mere tripping of a latch mechanism associated therewith. This application relates particularly to the power operated marker arm.

The main object of the invention is to utilize the power of the tractor to lift the marker arm of a tractor planter unit.

Another object is to provide a novel arrangement of parts whereby the marker may be elevated.

A further object of the invention is to provide a means for retaining the marker in inoperative position.

Another object is the provision of a marker arm retaining means which will decelerate the arm in its final positioning movement.

A further object is the provision of a modified form of marker comprising a folding marker arm.

Another object is the provision of a positive arm diverging means for such a folding marker arm.

A further object is the provision of a novel joint for a folding marker arm, having a buffer or bumper means therein to decelerate the converging movement of the folding arm portions when the folding marker is raised to inoperative position.

Other and further objects of this invention will appear from the following detailed description thereof, reference being had to the accompanying drawings in which:

Figure 1 is a fragmentary plan view of a tractor, showing a portion of a planter unit attached thereto, and a marker thereon in accordance with the present invention;

Figure 2 is a vertical sectional view adjacent to one of the rear corners of the planter frame, illustrating the power lift connection through which the marker arm is raised to inoperative position, the section being taken along the line 2—2 of Figure 1;

Figure 3 is a fragmentary plan view showing the latch for holding the marker arm in raised position;

Figure 4 is a detailed sectional view taken along the line 4—4 of Figure 3;

Figure 5 is a side view of the cam employed in transmitting lifting movement to the marker arm;

Figure 6 is a fragmentary plan view similar to Figure 1 and showing a modification comprising a folding marker arm in accordance with the present invention;

Figure 7 is a rear elevation of the folding marker in operative extended position with only a fragmentary portion of the implement frame being shown, and showing in dotted lines the relative positions of the parts of the folding marker arm when said arm is in inoperative position;

Figure 8 is a front elevation of the folding marker, showing it in inoperative or raised position;

Figure 9 is a fragmentary section of the folding marker arm joint taken along the line 9—9 of Figure 7;

Figure 10 is an enlarged cross sectional view taken along the line 10—10 of Figure 6; and Figure 11 is an enlarged cross sectional view taken along the line 11—11 of Figure 7.

In the drawing in Figure 1, I have generally illustrated a fragmentary portion of a tractor 12 having a planter 13, the left hand portion only of which is shown, mounted thereon. Since the planter construction forms the subject matter of my copending application above identified only such portion thereof is embodied in this application as will aid in the disclosure of the present invention, and will be hereinafter only generally referred to.

The planter 13 comprises an open rectangular frame comprising four angle iron members, only three of which, 14, 15 and 16, are shown. Bars 14 and 16 are each suitably secured to the tractor 12. The frame carries three planter units 17 (only two of which are shown), one each being mounted adjacent and outside of the rear tractor wheels and one being mounted between these wheels. Each of the planter units 17 is mounted for vertical pivotal movement about the front frame member 14 and is adapted to be elevated and lowered by a link and lever connection to a polygonal rock shaft 18 which is supported in brackets 19 on the rear frame member 16, and which is adapted to be rotated therein by a power take-off connection comprising arm 21, link 22 and arm 23 connected with the rock shaft 18. This power take-off connection derives its operating power from the motor of the tractor under the control of tripping means, all as more specifically described in my copending application. Suffice it here to say, briefly, that the power take-off connection derives its operating energy from a suitable power lift mechanism including a half-revolution clutch means of any suitable or desired type as is diagrammatically outlined at 73a, such clutch means including the arm 21. Such a power lift mechanism is suitably cooperatively associated with any type of power take-off means deriving its operating energy through suitable connections from any of the operating mechanisms or moving parts of the implement or tractor, for example, as illustrated in the drawings, from the power plant 74a of the tractor 12. The half-revolution clutch may be controlled by a suitable trip mechanism actuable by the tripping of a foot pedal 75a disposed to one side of and adjacent the operator's seat 76. The pedal 75a is suitably carried by the member 16 on the planter frame and connected with such trip mechanism by any convenient means such as the link 77. At each end of the rock shaft 18 a curved cam arm 24 is secured thereto by means of a U-shaped shackle bolt 25 (Figures 2 and 5) passing through openings in the fixed end of the cam arm 24, the intermediate portion of which engages around the polygonal rock shaft 18, nuts 26 being threaded on the leg portions thereof and securing the shackle bolt to the rock shaft. It will be noted that the inner end of the cam arm 24 is provided with a polygonally shaped pocket for complementary engagement with the rock shaft 18. The function of this cam arm 24 will be hereinafter described.

At each rear corner of the frame 13, a bearing bracket 27 joins the rear frame member 16 to the side frame member 15 and is secured thereto by means of bolts 28 and 29. An offset arm 31 is journaled at its intermediate portion in the bracket 27. One offset end of the arm 31 having a reduced portion 32 carries a roller 33 journaled thereon which is retained on the reduced portion 32 by a cotter pin 34. The other offset end portion of arm 31 is provided with a lateral ear 35 having a recess therethrough. Secured to the ear 35 by a bolt 36 is a clamping member 37 comprising two semicircular portions 38, which have their ends shaped to form ears 39.

A marker arm 42 is suitably secured in the clamping member 37 in the semicircular portions 38, and carries on its outer end, between two ears 43, an L-shaped bracket 44, one leg of which is secured thereto by a bolt 45, and the other leg of which carries a marker disk 46 rotatably mounted thereon.

A brace rod 41 is suitably connected to the arm 42 at one end and at its other end to the end of frame member 14 for purposes of retaining the marker arm in a vertical plane as it is swung from operative to inoperative positions and vice versa and to maintain the arm rigidly as the marker disk engages the ground.

It will be understood that the other rear corner of the frame 13 (not shown) carries a similar arrangement of marker arm and operating means.

Referring to Figures 1 to 4, inclusive, it will be noted that the frame member 16 carries thereon at its bent portion, and secured thereto an S-shaped strap bracket member 47, one end of which is secured to the top of the horizontal portion of frame member 16 by means of a bolt 48. A substantially straight bracket member 49 secured to the vertical portion of the frame member 16 by means of bolt 29, extends vertically from the vertical end portion of the frame member 16, and has an offset or bent end in close proximity to the offset end 51 of the bracket 47. Surrounding the proximate ends of the brackets 47 and 49, is a two part casing 52 comprising two complementary sections 53 and 54 having oppositely disposed depressions 55 and 56 therein, external outwardly extending trunnions or pivot bearings 57 and 58, and rearwardly extending attaching ears 59 and 61 having aligned recesses therein. The ends of the brackets 47 and 49 are clamped between the ears 59 and 61. A spring projected plunger comprising a rod 62 having an enlarged outer end 63 and surrounded by a coil spring 64, carries a buffer block 65 and is mounted for sliding movement in the depressions 55 and 56. The other end of the rod 62 slides in a recess provided in the opposite or inner ends of the sections 53 and 54, and extends outwardly of the casing 52, being retained in said casing by a cotter pin 67 against the pressure of spring 64. A hooked latch member 68 is secured between two strap members 69 and 71, and is mounted for pivotal movement about the trunnions or bearings 57 and 58.

The strap member 69 is longer than the member 71 and is provided with an opening 72 through which a rope or like flexible element 73 is adapted to pass and be secured to the member 69. The strap members 69 and 71 are secured together by a bolt 74 passing through them and the latch member 68. A coil spring 75 is suitably connected between one end of the latch member 68 and the bracket 49, and is adapted to normally maintain the latch member 68 in the path of movement of the marker arm. Any suitable stop means may be provided to engage the latch 68 or the strap members 69 and 71 to limit the movement of the latch in engaging direction.

The marker is operated as follows:

Assuming that the marker is in operative position, that is, in contact with the ground as shown in Figures 1 and 2, when the power take-off clutch is energized by tripping of the foot pedal 75a, a rotary motion is imparted to the rock shaft 18 by crank arm 21 through link 22 and arm 23. The cam arm 24 is rotated forwardly as viewed in Figure 2, engaging the roller 33 on arm 31, exerting a downward pressure thereon and imparting a vertical swinging movement to the marker arm 42. When the marker arm has about reached its maximum vertical position, it will force the spring latch member 68 back against the pressure of spring 75 until it has passed the end of the latch member, when the latter will spring back behind the marker arm 42, thereby holding the arm in raised position. It frequently happens that the marker arms are raised with a considerable velocity, and in order to prevent damage to the arm 42 or to the planter frame, the buffer or bumper member 65 is provided.

The bumper 65 is adapted to be struck by the marker arm 42 in its maximum raised position to cushion and yieldingly stop the arm at the upper limit of its swinging movement. It is to be understood that a similar latch and buffer member is provided on the other rear corner of the planter frame for the other marker arm. The flexible tripping member 73, connected to the outer end of the latch arm 69, is extended to the operator's seat or to some proximate accessible point, so that the operator may trip the latch of either marker arm from his position on the seat, to drop the appropriate marker arm as he starts the implement back across the field.

Referring now to the modification disclosed in Figures 6 to 11, inclusive, Figure 6 illustrates the same type of tractor planter shown in Figure 1, with a modified form of marker mounted thereon.

Referring to Figures 7, 8 and 11, the marker, in this case, generally consists of two sections or arms 81 and 82, pivoted to each other at 83. The inner end of section 81 is universally connected to the side frame member 15 by means of a bolt 84 mounted through the legs of a V-shaped casting 85 which is in turn pivoted to a bracket 86 carried by and connecting frame members 15 and 16 by means of a bolt 87. The casting 85 is provided with an extension or arm 88 which carries a roller 91 journaled on a reduced portion 89 thereof, and which is retained thereon by a washer 92 and cotter pin 93.

As in the case of the form shown in Figures 1 to 5, inclusive, a cam arm 24 is carried by the rock shaft 18 and is adapted to engage the roller 91 to impart a swinging movement to the marker arm 81. It will be, of course, understood that the power-lift mechanism and control means therefor hereinbefore referred to in conjunction with the description of the detailed structure disclosed in Figure 1, are employed to impart rocking movement to shaft 18 for transmitting power-lift energy from the power plant of the tractor to the marker arms 81.

The outer end of section 81 is joined with the section 82 by a pivotal connection generally indicated at 83. The sections 81 and 82 are preferably made of channel iron. At the joint 83, one flange of the section 82 is bent so as to be in the same plane as the web portion, and the opposite flange is laterally offset, as shown in Figure 8, so that the section 82 may fold upon the section 81. The joint connecting the sections comprises a bolt 95 having an eye 96 at one end and a threaded portion at the other, passing through the overlapping portions of the arms. The bolt 95 carries a spacing sleeve or collar 97 abutting the end portion of section 81, and against which, at the other end, the overlapping ends of braces 98 and 99 are adapted to abut. The other ends of the braces are secured to the web portions of members 81 and 82, respectively. The bolt 95 passes through the overlapping ends of the braces 98 and 99, and its eye 96 in cooperation with the sleeve or collar 97, retains the ends of the braces 98 and 99 from displacement. The bolt 95 is held in position at the joint by a lock nut 101. The apertured end of the brace 99 is adapted to freely rotate on the bolt 95.

A buffer spring 102 is suitably secured to the section 82, adjacent to the pivot bolt 95, with its free end 104 adapted to slide longitudinally of the section 82 along the inner face of one of the flanges thereof, and being so disposed as to yieldingly abut the section 81 when the two sections converge to the position shown in Figure 8. Secured to the section 82 at the joint, is a bracket 107, the base of which is offset in U-shaped formation and through the lower side flange of which the bolt 95 passes. Also passing through the intermediate portion of said offset base are securing rivets 103 for securing said intermediate portion of the base to the flange of section 82, one or more of the rivets being utilized for securing the spring 102 to the section 82 as best illustrated in Figures 8 and 10. An L-shaped lever 108 is pivotally connected at one end of the outer end of the bracket 107 at 109. One end 111a of a rod 111 is adapted to pass through an opening in the other end of the L-shaped lever 108 and is retained therein by means of a cotter pin 112. the other end 111b of rod 111 being pivotally secured to a bracket 113 that is suitably secured to the vertical flange of the frame member 16, by passing through an opening in the bracket and having a cotter pin 114 inserted transversely through its end. The lever 108 is laterally offset with respect to and beyond the plane of the sections 81 and 82, and in a position to engage the sleeve or collar 97, as shown in Figures 6 and 8, so that when the sections are folded or unfolded, one edge 115 of said lever is adapted to engage the collar 97 during a portion of the movement of the marker for a purpose to be hereinafter described.

A bracing rod 105 is connected to an eye 96 of the bolt 95 at one end, and at its other end to a bracket 106 secured to frame member 15, to brace the marker in extended position as the marker element 123 rolls along the ground.

A latch member 116 is pivotally mounted at the end of the frame member 16 and comprises a hooked end latching portion 117 and an eye 118 adjacent its pivoted end, through which a flexible element may be passed for attachment thereto. As in the case of latch 68, this flexible element is adapted to extend to the operator's seat, for the purpose of releasing the latch. The latch portion 117 extends into the path of movement of the section 81 of the marker and is provided with a cam portion 119 adapted to be engaged by the marker to automatically depress the latch as the section 81 approaches its final raised position. A coil spring 121, suitably seated between the other end of the latch member 116 and the frame 16, normally projects the latch to operative position. Any suitable stop means may be employed to engage the latch to limit the movement thereof in engaging direction. Mounted on the end of frame member 16 and suitably secured thereto is a U-shaped spring arm buffer or bumper member 122, one leg of which is secured to the frame member 16 while the other leg is spaced from the fixed leg and extends into the path of movement of the section 81 of the marker. This spring bumper 122 is adapted to be engaged by the section 81 in its maximum raised position to cushion and yieldingly stop the section at the upper limit of its swinging movement.

The outer end of section 82 has secured thereto a marker disc 123 in the same manner as in the embodiment of the invention disclosed in Figures 1 to 5, inclusive.

In operation, assuming that the marker is in ground engaging position as shown in Figures 6 and 7, when the power take-off clutch is energized by tripping of the foot pedal adjacent the operator's seat, the arm 21 draws on the link 22 thereby imparting rotational movement to rock shaft 18. The cam 24, rotating with the shaft 18, engages the roller 91, thereby pivoting the arm 88 and bracket 85 about the bolt 87 in a clockwise direction, as shown in Figure 7.

As the section 81 of the marker arm moves upwardly through the first part of its angular movement, the section 82 remains in substantial alignment with section 81 until, due to the eccentric position of the pivot portion 111b of rod 111 relative to pivot 87 of section 81, the outer end of rod 111 begins to move outwardly relative to the outer end of section 81. This permits of the pivoting of section 82 about pin 95. As this pivoting takes place, the edge 115 of lever 108 approaches sleeve 97 until contact takes place. For the greater portion of the remaining upward angular movement of section 81, the edge 115 of lever 108 remains in contact with the sleeve 97 until section 81 reaches a position approximately three-fourths of total upward movement, when the edge 115 of lever 108 slowly disengages from contact with sleeve 97 thus permitting section 82 to drop to a vertical position, as shown in Figure 8. By the provision of the link arrangement and the cooperation of the lever 108 with sleeve 97, the marker disk 123 is retained in a position free of the ground during the entire lifting or raising operation thus avoiding dragging of the disk along the ground.

Should the section 82 be released rapidly, the buffer spring 102, which not only cushions the movement of the section 82 but also acts as a stop to prevent the marker disc 123 from striking the section 81, comes into contact with the section 81. When this section has about reached its maximum elevated position, it cams the latch 116 back against the pressure of spring 121 until it has passed the outermost end of the latch, when the latter will automatically swing back to engage section 81 in raised position. The free end of the spring bumper 122 is at this time engaged by the section 81 to cushion it as it approaches its maximum elevated position.

Assuming that the arm is in raised position, as shown in Figure 8, when the latch 116 is retracted, the marker may now be lowered by the rock shaft 18. The section 82 remains in a vertical position until the section 81 assumes a position approximately one-fourth of its total downward movement, at which time the edge 115 of the lever 108 engages the collar 97, at the joint 83. As the section 81 continues downwardly, the section 82 is swung outwardly. The edge 115 of lever 108 remains in contact with the collar 97 throughout the major portion of the downward angular movement of section 81. During this part of the downward movement of section 81, end 111a of rod 111 moves inwardly relative to pivot 95 due to the eccentric position of pivot 111b with reference to pivot 87, thus drawing bracket 107 about the pivot 95 and thereby causing the marker disk 123 to move outwardly with the section 82.

During the last portion of the downward angular movement of section 81, the lever 108 disengages from sleeve 97 until rod 111 and pivot 109 come into a straight line and remain so until the disk 123 engages the ground. It will be noted here again that the novel link arrangement performs a similar function in the lowering operation, namely, that of retaining the marker disk 123 free of the ground until the sections of the arm are in longitudinal alignment, thereby preventing dragging of the disk along the ground.

It is to be noted that by providing a folding power operated marker, the overall width of the planter is materially reduced. The center of gravity of the marker is considerably lower when the marker is in raised position than in the embodiment disclosed in Figures 1 to 5, inclusive, and lends itself to easier and quicker operation with less energy required in its operation inasmuch as the momentum arm of weight concentration of the marker is materially reduced.

So far as I am aware, I am the first in the art to provide a tractor planter marker adapted to be power operated entirely under the control of the operator. The provision of a folding marker is also believed to be an innovation in the art.

While I have disclosed two preferred embodiments of my invention, I do not wish to limit myself thereto. It will be understood by those skilled in the art, that changes may be made therein without departing from the spirit and scope of the appended claims.

What I claim and desire to secure by Letters Patent is:

1. The combination with a tractor, of a planting implement connected thereto and comprising a laterally swinging marker arm, a power take-off means driven by the engine of the tractor, and mechanism driven by said power take-off means for effecting a lateral and vertical power lift of said marker arm.

2. The combination with a tractor, of a planting implement comprising laterally and vertically swinging marker arms pivotally supported on each side of the implement, a power take-off means driven by the engine of the tractor, power lift mechanism driven by said means and operable to raise said marker arms laterally to their inoperative positions, and control means actuatable from the driver's position on said tractor for controlling the operation of said power lift mechanism.

3. The combination of a tractor, having a power take-off means, a detachable planting implement comprising a frame, a plurality of planter units connected to said frame, laterally swinging marker arms pivotally supported on said frame at each side thereof, a lifting shaft extending transversely of said frame and operatively connected to raise said marker arm laterally, and means for operably connecting said lifting shaft with said power take-off means.

4. The combination with a tractor having a power take-off means driven by the engine of the tractor, of a planting implement adapted to be attached to and detached from said tractor, said implement comprising a frame, a plurality of planter units mounted on said frame, marker arms pivotally supported on said frame at each side thereof to swing into and out of operative position in planes substantially at right angles to the implement, a rock shaft extending transversely of said frame, means operative to raise said marker arms upon rocking movement of said shaft, and motion transmitting mechanism operatively connecting said power take-off means with said rock shaft, comprising crank means for imparting a rocking movement to said latter shaft.

5. A planting implement comprising a marker movable into operative and inoperative positions, means for moving said marker, spring cushioning means for yieldingly retarding the motion of said marker as the latter approaches inoperative position, and latch means independent of said cushioning means for retaining said marker in inoperative position, said marker initially engaging said latch means and then said cushioning means as the marker is moved from operative position to inoperative position.

6. A planting implement comprising a marker arm pivotally supported for swinging movement between a lower, operative position, and a raised, inoperative position, power driven mechanism for swinging said marker arm to a raised position, and compressible spring means supported in stationary relation with respect to the implement for yieldingly retarding the motion of said marker arm adjacent to the upper limit of its swinging movement.

7. A planting implement comprising a frame, a plurality of planter units mounted thereon, marker arms pivotally supported on said frame for lateral swinging movement, means on said frame for swinging said marker arms to their raised positions, spring means for yieldingly retarding the motion of each of said marker arms adjacent to the upper limit of its swinging movement, and latch means independent of said spring means for retaining the marker arms in inoperative position.

8. In combination, a marker, power operated means for moving said marker to inoperative position, cushioning means for retarding the movement of said marker adjacent its upper limit of movement, and latch means independent of said cushioning means for retaining said marker in inoperative position.

9. In combination, a marker comprising an arm, power operated means for moving said marker to operative and inoperative position comprising a rock shaft and a cam thereon, and cam follower means on said arm and extending freely into the path of movement of said cam and adapted to be engaged thereby to move said marker, said cam follower means being movable into and out of operative engagement with said cam.

10. In combination, a planter, a marker arm pivotally mounted thereon, a second marker arm pivotally mounted on said first arm, and a tension member connecting said second arm with said planter for imparting pivotal movement to said second arm relative to said first arm.

11. In combination, a planter, a marker arm pivotally mounted thereon, a second marker arm pivotally mounted on said first arm, and a tension connection connecting said second arm with said planter for imparting pivotal movement to said second arm relative to said first arm, said tension connection comprising a pivotally swinging link.

12. In combination, a planter, a marker arm pivotally mounted thereon, a second arm, means comprising a bolt pivotally connecting said second arm to said first arm, a rotatable sleeve on said bolt, and a tension connection connecting said second arm to said planter, said tension connection comprising a link adapted to abut said sleeve during a portion of the movement of said arms.

13. A marker comprising pivotally connected arms and a bumper member on one of said arms adapted to be engaged by another of said arms.

14. A latch for retaining a marker arm in inoperative position comprising a mounting member, trunnions on said mounting member, arms mounted on said trunnions, a hooked end member positioned between said arms, and means for normally projecting said hook end member to operative position.

15. In combination, a marker adapted to be raised and lowered comprising a section, a second section pivotally connected to said section, said sections being adapted to fold and unfold in raising and lowering movements, and means for retarding folding movement of said second section during raising movement whereby a marker element positioned on said second section is maintained free of the ground during such movement.

16. In combination, a marker having a marking element thereon and adapted to be raised and lowered comprising a section, a second section pivotally connected with said section and carrying said marking element, said sections being adapted to fold and unfold in raising and lowering movements, and means associated with one of said sections for retarding folding movement of said second section in raising movement thereby maintaining said marking element free of the ground during such raising movement.

17. In combination, a marker having a marking element thereon and adapted to be raised and lowered, comprising a section, a second section pivotally connected to said section and carrying said element, said sections being adapted to fold and unfold in raising and lowering movements, and means associated with one of said sections for controlling unfolding movement of said second section for maintaining said element free of the ground during the lowering movement of said marker.

18. In combination, a marker having a marking element thereon and adapted to be raised and lowered, comprising a section, a second section pivotally connected to said section, said sections being adapted to fold and unfold in raising and lowering movements, and means associated with said sections for controlling folding and unfolding movements of said second section during raising or lowering movements, respectively, whereby the marking element is maintained free of the ground during raising or lowering movements.

19. In combination, a marker, power-operated means for moving said marker to inoperative position, yieldable bumper means for retarding the movement of said marker as it approaches its limit of movement to inoperative position, and latch means for retaining said marker in inoperative position.

20. A marker comprising a pair of pivotally connected arms adapted to fold and unfold, and yieldable cushioning means adapted to cooperate with one of said arms to cushion the arm as it approaches its limit of folding movement.

21. In combination, a planter, a marker pivotally connected thereto, said marker comprising an arm, a second arm, means pivotally connecting said arms, anti-friction means associated with said connecting means, said arms being adapted to fold and unfold in moving to inoperative and operative positions, and a tension connection between said second arm and said planter and including means adapted to cooperate with said anti-friction means to control folding and unfolding movement of said arms to inoperative and operative positions.

22. In combination, a planter, a marker pivotally connected thereto, said marker comprising an arm, a second arm, means pivotally connecting said arms, anti-friction means associated with said connecting means, said arms being adapted to fold and unfold in moving to inoperative and operative positions, tension transmitting means connecting said second arm with said planter and including a link adapted to cooperate with said anti-friction means to control folding and unfolding movement of said arms to inoperative and operative positions, and means adjacent the pivotal connection between the marker and planter for cushioning movement of the marker as it approaches the limit of movement to inoperative position.

23. In combination, a planter, a marker pivotally connected thereto, said marker comprising an arm, a second arm, means pivotally connecting said arms, anti-friction means associated with said connecting means, said arms being adapted to fold and unfold in moving to inoperative and operative positions, means comprising a plurality of links connecting said second arm with said planter and including means adapted to cooperate with said anti-friction means to control folding and unfolding movement of said arms to inoperative and operative positions, and means adjacent the pivotal connection of said arms for cushioning moving of said arms as the marker approaches its limit of movement to inoperative position.

24. In combination, a planter, a marker pivotally connected thereto, said marker comprising an arm, a second arm, means pivotally connecting said arms, anti-friction means associated with said connecting means, said arms being adapted to fold and unfold in moving to inoperative and operative positions, means comprising a plurality of links connecting said second arm with said planter and including means adapted to cooperate with said anti-friction means to control folding and unfolding movement of said arms to inoperative and operative positions, means adjacent the pivotal connection between the marker and planter for cushioning movement of the marker as it approaches the limit of movement to inoperative position, and means adjacent the pivotal connection of said arms for cushioning folding of said arms as the marker approaches its limit of movement to inoperative position.

25. The combination with a tractor, of a planting implement connected thereto and comprising an upwardly swinging marker arm, power take-off mechanism driven by the engine of the tractor, a cam, motion transmitting means driven by said power take-off means and adapted to move said cam from a normal position to a second position and permitting movement of said cam from said second position back to said normal position, a cam follower operatively connected with said marker arm and adapted to be actuated by said cam when the latter moves to its second position and to raise said marker arm, and means operative to hold said marker arm raised when said cam moves from its second position back to its normal position.

26. The combination with a tractor, of a planting implement connected thereto and comprising an upwardly swinging marker arm, a cam cooperating with said marker arm and adapted when moved to one position to raise said marker arm to its inoperative position, power take-off mechanism driven by the engine of the tractor and operative to actuate said cam to said position, and latch means for holding said marker arm in its raised position when said cam returns to its normal position.

27. The combination with a tractor, of a planting implement connected thereto, two upwardly swinging marker arms adapted to engage the ground at opposite sides of the planting implement, cam followers operatively connected with each of said marker arms, cams adapted to cooperate with said followers, power take-off mechanism driven by the engine of the tractor and operative to actuate said cams to raise said marker arms, and means operative to hold said marker arms in their raised positions independently of movement of said cams.

28. The combination with a tractor, of a planting implement connected thereto and comprising an upwardly swinging marker arm, power take-off mechanism driven by the engine of the tractor, and marker arm lifting mechanism driven by said power take-off mechanism and adapted to be moved thereby to one position for raising said marker arm, said lifting mechanism being movable back to its original position independently of movement of said marker arm.

29. The combination with a tractor, of a planting implement connected thereto, a folding marker arm associated with said implement and comprising sections adapted to have relative folding movement when said marker arm is moved to its inoperative position, power take-off mechanism driven by the engine of the tractor, means driven by said mechanism operative to move said marker arm to its inoperative position, and means for causing relative folding movement between the sections of said marker arm when said arm is moved to its inoperative position.

30. The combination with a tractor, of a planting implement connected thereto, a folding marker arm associated with said implement and comprising sections adapted to have relative folding movement when said marker arm is raised to its inoperative position, power take-off mechanism driven by the engine of the tractor, a cam driven by said power take-off mechanism, a cam follower operatively connected with said marker arm and adapted to be actuated by said cam to raise said marker arm, and means for causing relative folding movement between the sections of said arm as said arm is raised to its inoperative position.

31. In combination, a marker comprising a marker arm, a second arm fixedly connected to and projecting from one end of said marker arm, a roller directly mounted upon the free end of said second arm, and means for moving said marker arm into operative and inoperative positions comprising a rock shaft and a cam mounted thereon for movement directly therewith toward and away from said roller, said cam being actuated by said rock shaft into contact with said roller to move said marker arm.

32. In combination, a marker comprising a pivotally supported marker arm, a pintle member fixedly secured to said arm and projecting outwardly away from the pivoted end thereof, means for moving said marker arm into operative and inoperative positions comprising a shaft, a cam thereon, and cam follower means mounted upon the outer free end of said pintle member for bodily movement therewith, said cam follower means being disposed freely in the path of said cam and adapted to be directly engaged thereby for moving said marker arm.

33. In combination, a marker comprising a marker arm pivoted for swinging movement in one plane, means for moving said arm into operative and inoperative positions comprising a shaft, and a cam mounted on said shaft and having its operating edge disposed radially thereto for movement in a plane disposed substantially at right angles to the plane in which said marker arm moves, said cam being adapted for direct lateral contact with said marker arm to move the same when said shaft is actuated.

34. In combination, a marker comprising an arm, means for moving said marker to operative and inoperative positions comprising a rock shaft and a cam thereon, means for actuating said rock shaft, and cam follower means on said arm and extending freely into the path of movement of said cam and adapted to be engaged thereby to move said marker, said cam follower means being movable into and out of operative engagement with said cam.

35. A planting implement comprising a frame, laterally swingable marker arms supported on said frame at each side thereof, a single shaft extending transversely of the frame, a cam at each end of said shaft, cam follower means each being connected with one of said marker arms and supported thereby in the path of movement of the cam adjacent said one marker arm for movement independently of said cam when said arm is in operative position, and means for actuating said shaft to cause the cams to engage the cam follower means for moving the marker arms laterally into inoperative position.

36. A planting implement comprising laterally swinging marker arms pivotally supported upon each side of said implement, a single lifting shaft extending transversely of said implement and operatively connected to raise said marker arms laterally and vertically, a half-revolution clutch, and means for transmitting motion from said half-revolution clutch to said lifting shaft.

37. The combination with a tractor, of a planting implement connected therewith and comprising a laterally swingable marker arm, an operably connected train of driving mechanism including a half-revolution clutch, and cooperative cam means connected with said clutch and driven thereby for effecting a lateral and vertical power lift of said marker arm.

38. The combination with a tractor having an engine, of a planting implement adapted to be attached to and detached from said tractor, said implement comprising a frame, a plurality of planter units mounted on said frame, marker arms pivotally supported on said frame at each side thereof to swing into and out of operative position in planes substantially at right angles to the implement, a rock shaft extending transversely of said frame, means operative to raise said marker arms upon rocking movement of said shaft, and motion transmitting means operatively connecting said rock shaft with said tractor engine comprising an automatically operable half-revolution clutch connected with said engine, and means operatively connecting said rock shaft with said clutch.

39. A planting implement comprising a laterally swingable marker, an operably connected train of driving mechanism including a half-revolution clutch, and cooperative cam means for moving said marker comprising a shaft connected with said clutch, a cam on said shaft, and cam follower means on said marker and extending freely into the path of movement of said cam and adapted to be engaged thereby to move said marker, said cam follower means being movable into and out of operative engagement with said cam.

In witness whereof, I hereunto subscribe my name this 16 day of November, 1929.

CHARLES H. WHITE.